US006771822B1

United States Patent
Brackett

(10) Patent No.: US 6,771,822 B1
(45) Date of Patent: Aug. 3, 2004

(54) METHOD AND APPARATUS FOR STORING IMAGE FRAME WITH USER-SELECTED COMPRESSION

(75) Inventor: Charles Cameron Brackett, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 584 days.

(21) Appl. No.: 09/667,878

(22) Filed: Sep. 22, 2000

(51) Int. Cl.[7] .............................. G06K 9/36; G06K 9/00
(52) U.S. Cl. ....................................... 382/232; 382/128
(58) Field of Search ................................ 382/232, 239, 382/240, 251, 128, 130, 131; 600/437, 443; 345/521, 516, 564; 128/915, 916; 348/231.99, 231.1, 231.9

(56) References Cited

U.S. PATENT DOCUMENTS

| 6,231,510 B1 | * | 5/2001 | Negrin et al. | 600/443 |
| 6,238,341 B1 | * | 5/2001 | Mullen | 600/437 |
| 6,262,749 B1 | * | 7/2001 | Finger et al. | 345/564 |
| 6,529,631 B1 | * | 3/2003 | Peterson et al. | 382/232 |

* cited by examiner

Primary Examiner—Vikkram Bali
(74) Attorney, Agent, or Firm—Ostrager Chong & Flaherty LLP

(57) ABSTRACT

A method and an apparatus for providing lossy compression of digital images on a per image basis. The system user is able to manually vary the degree or level of compression applied to a frozen image frame using a rotary dial. Each resulting compressed image can be viewed in real-time on the display monitor. The user must determine the highest compression level which still provides an image having sufficient diagnostic quality in the region of interest. This concept can be applied to any imaging device which stores images in internal memory or sends images for storage to external memory.

20 Claims, 3 Drawing Sheets

METHOD AND APPARATUS FOR STORING IMAGE FRAME WITH USER-SELECTED COMPRESSION

FIELD OF THE INVENTION

This invention generally relates to imaging systems. In particular, the invention relates to the storage of digital images in memory, whether that memory is incorporated in or connected to the imaging system. Although the field of the invention is wide, encompassing digital imaging systems, the preferred embodiment of the invention will be disclosed with reference to an ultrasound imaging system used in medical diagnostics, with the understanding that the invention has application in other types of ultrasound imagers as well as digital imagers other than ultrasound imagers.

BACKGROUND OF THE INVENTION

Conventional ultrasound imagers create two-dimensional images of biological tissue by scanning a focused ultrasound beam in a scan plane and for each transmitted beam, detecting the ultrasound wave energy returned along a respective scan line in the scan plane. A single scan line (or small localized group of scan lines) is acquired by transmitting focused ultrasound energy at a point, and then receiving the reflected energy over time. A B-mode ultrasound image is composed of multiple image scan lines. The brightness of a pixel on the display screen is based on the intensity of the echo returned from the biological tissue being scanned. The outputs of receive beamformer channels are coherently summed to form a respective pixel intensity value for each sample volume in the scanned object. These pixel intensity values are log-compressed, scan-converted and then displayed as a B-mode image of the anatomy which was scanned.

If the ultrasound probe is swept over an area of body, a succession of image frames (corresponding to spaced slices intersecting the body being examined) can be displayed on the monitor. In one type of ultrasound imaging system, a long sequence of the most recent images are stored and continuously updated automatically in a cine memory on a first-in, first-out basis. The cine memory is like a circular image buffer that runs in the background, capturing image data that is displayed in real time to the user. The cine memory acts as a buffer for transfer of images to digital archival devices via the host computer. When the user freezes the system (by operation of an appropriate device on an operator interface), the user has the capability to view image data previously captured in cine memory. The image loop stored in cine memory can be reviewed on the display monitor via trackball control incorporated in the operator interface, and a section of the image loop can be selected for hard disk storage. Any acquired or projected image can be stored internally on the system hard disk or on a magneto-optical disk (MOD) inserted in a disk drive.

In addition to storing images internally, modern imaging systems need to be able to transfer images to various types of remote devices, such as storage devices, via a communications network. To successfully transfer images, the relevant networking features of the imager must be compatible with the networking features of the destination remote device. In particular, the imager must place the data to be transferred in a format which can be handled by the destination remote device. An attempt to accomplish the foregoing is the adoption of the DICOM (Digital Imaging and Communications in Medicine) standards, which specify the conformance requirements for the relevant networking features. The DICOM standards are intended for use in communicating medical digital images among printers, workstations, acquisition modules (such as an ultrasound imaging system) and file servers. The acquisition module is programmed to transfer data in a format which complies with the DICOM standards, while the receiving device is programmed to receive data which has been formatted in compliance with those same DICOM standards.

The DICOM system is designed to facilitate the communication of digital images of different types, e.g., X-ray, computerized tomography, magnetic resonance and ultrasound imaging. All DICOM activities are handled in a queued manner by application software running on a host computer incorporated in the imager. In one type of ultrasound imager, the user can select any image in cine memory to be sent in DICOM format via a LAN to a remote device having DICOM capability. The host computer of the ultrasound imaging system is programmed with DICOM system software which facilitates transmission of image frames from the cine memory to the remote DICOM device via the host computer hard disk and the LAN.

In the conventional ultrasound imager, images can be sent to a storage device in either an automatic or a manual mode, depending on the user configuration. When the automatic mode is configured, console keys are used to capture the image and to store it on the hard disk. The request is queued to a DICOM queue manager (preferably implemented in software), which requests an association with the destination remote storage device. After the association with the remote storage device has been opened, the queue manager "pushes" the image to the remote storage device without user intervention. The transfer is done in the background while scanning or other operator activities continue. In the manual mode, the captured images are archived on the hard disk or on a MOD during the exam(s). Upon completion of the exam(s) the images are tagged using an archive menu and queued to any of the network devices that have been configured on the imager. The images are sent sequentially in the background while scanning or other operator activities proceed.

One of the current problems in the medical industry is the large amount of digital image data which needs to be stored, requiring vast memory capacity. For example, all of the images produced by an ultrasound imaging machine are of static sizes (about 385 kilobytes for black/white image frames and about 1 megabyte for color images). As the number of digital images being saved increases, so does the amount of hard disk space which is required. Because increases in the hard disk space capacity result in corresponding increases in operating costs, hospitals and clinic are seeking ways to decrease the amount of hard disk space used.

One solution to the foregoing problem is data compression. Data compression involves techniques for storing data in a format that requires less space than usual. Compressing data is the same as packing data. There are a variety of data compression techniques.

Lossless compression refers to data compression techniques in which no data is lost. For most types of data, lossless compression techniques can reduce the space needed by only about 50%, i.e., lossless compression techniques achieve a compression ratio at best of about 2:1. For greater compression, one must use a lossy compression technique.

Lossy compression refers to data compression techniques in which some amount of data is lost. Lossy compression technologies attempt to eliminate redundant or unnecessary information. Only certain types of data, e.g., graphics, audio, and video, can tolerate lossy compression. One known lossy data compression technique is JPEG, which stands for Joint Photographic Experts Group. JPEG is a lossy compression technique for color images. Although it can reduce files sizes to about 5% of their normal size, i.e., achieving a compression ratio of up to 20:1, some of the original data is lost in the compression. The resulting image degradation can be detrimental in the context of medical diagnostic imaging.

However, it is possible to compress images, using lossy techniques, with a compression ratio of up to 20:1, while still maintaining diagnostic quality. It should be noted that the compression ratio would vary from one image to the next in terms of maintaining diagnostic quality. For example, an image with primarily black on it will support a higher compression ratio than an image that had a more complex image with multiple colors. Now, it is clear that not all images will have the same compression ratio. As used herein, the term "diagnostic quality" means that the images have sufficient detail to enable them to be reliably used by a physician in making a diagnosis of the subject's medical condition.

Studies have shown that lossy compression, up to a certain compression ratio, provides images which are acceptable for use in clinical diagnosis. However, the acceptable compression ratio will vary on a per image basis. This being the case, it would be very difficult for a picture archiving and communications system (PACS) or other receiving device to perform lossy compression automatically, since the receiving device will receive many images from many vendors, all requiring different compression ratios of acceptance. Moreover, the compression ratio will vary from one image to the next in terms of maintaining diagnostic quality. For example, an image with primarily black in it will support a higher compression ratio than an image that has multiple colors. Thus, not all images require the same compression ratio to maintain an acceptable level of diagnostic quality.

Thus there is a need for a method and an apparatus for providing lossy compression of digital images on a per image basis.

SUMMARY OF THE INVENTION

The present invention is a method and an apparatus for providing lossy compression of digital images on a per image basis. In accordance with the preferred embodiments of the invention, the system user is able to manually vary the degree or level of compression applied to a frozen image frame, view each resulting compressed image on the display monitor, and determine the highest compression level which still provides an image having sufficient diagnostic quality in the region of interest.

The concept of the invention can be applied to any imaging device which stores images in internal memory or sends images for storage to external memory. In particular, the invention has application in medical diagnostic imaging devices, such as ultrasound scanners, computer-aided tomographic scanners, magnetic resonance imagers, and so forth. In accordance with the preferred embodiments of the invention, the image data in an image frame undergoes lossless compression prior to storage in memory, using a level of compression or a compression ratio which is selected by the system user.

In accordance with the preferred embodiments of the invention, an operator input device is provided on the imaging system that allows the user to manually vary the level of compression or the compression ratio while viewing each compressed image. The level of compression or the compression ratio could be set by turning a dial, by manipulating keys on a keyboard, by translating a calibrated sliding mechanism, by interacting with virtual, i.e., soft, keys of a graphical user interface, or any other suitable operator input device.

The method in accordance with one preferred embodiment of the invention comprises the following steps. During an examination performed on an ultrasound imaging system, the system user will scan a patient by moving a hand-held ultrasound probe over the surface of a part of the patient's anatomy. When the user has found an image of interest, the user will then operate an input device which actuates a freeze image function. In response to actuation of the freeze image function, the image is frozen on the display monitor of the imaging system. Typically, the frame of image data corresponding to the frozen image is stored in a cine memory (along with a sequence of the preceding image frames).

After the image of interest has been frozen, the user can begin to compress the image data for that image by operating the variable compression input device. As the level of compression is adjusted, a new image having the adjusted compression level is automatically displayed on the screen.

In accordance with the preferred embodiment of the invention, the frame of image data corresponding to the original frozen image is always maintained in memory in uncompressed form. This is important, as the compression is lossy, so the original image must be maintained to allow the user to decrement the level of compression or the compression ratio. Each newly compressed image is derived by applying a respective level of compression to the original frame of uncompressed image data. Only the most recently compressed image is also stored temporarily in the cine memory and then displayed, the next most recent compressed image being overwritten in cine memory at that time.

As the scanner receives signals from the user input device to adjust the compression level, the newly adjusted image frame is displayed on the screen in real-time. The user can then stop adjusting the compression at the point where he/she has determined the image to still have an acceptable clinically diagnostic quality. When the system user decides that the compressed image being viewed is acceptable for storage, the user will then operate an input device which actuates a save image function. In response to actuation of the save image function, the compressed version of the frozen image is captured from cine memory and stored in the destination storage device, whether the latter is the imaging system hard disk, a storage device connected to the imaging system via a network or any other storage device. Thus once the user has selected the appropriate compression level, the user can then save that image. With this method, the amount of data stored for each image will vary. The overall result will be saved disk space while maintaining diagnostic quality.

DETAILED DESCRIPTION OF THE PREFERRED EMBODIMENTS

Figure 1:
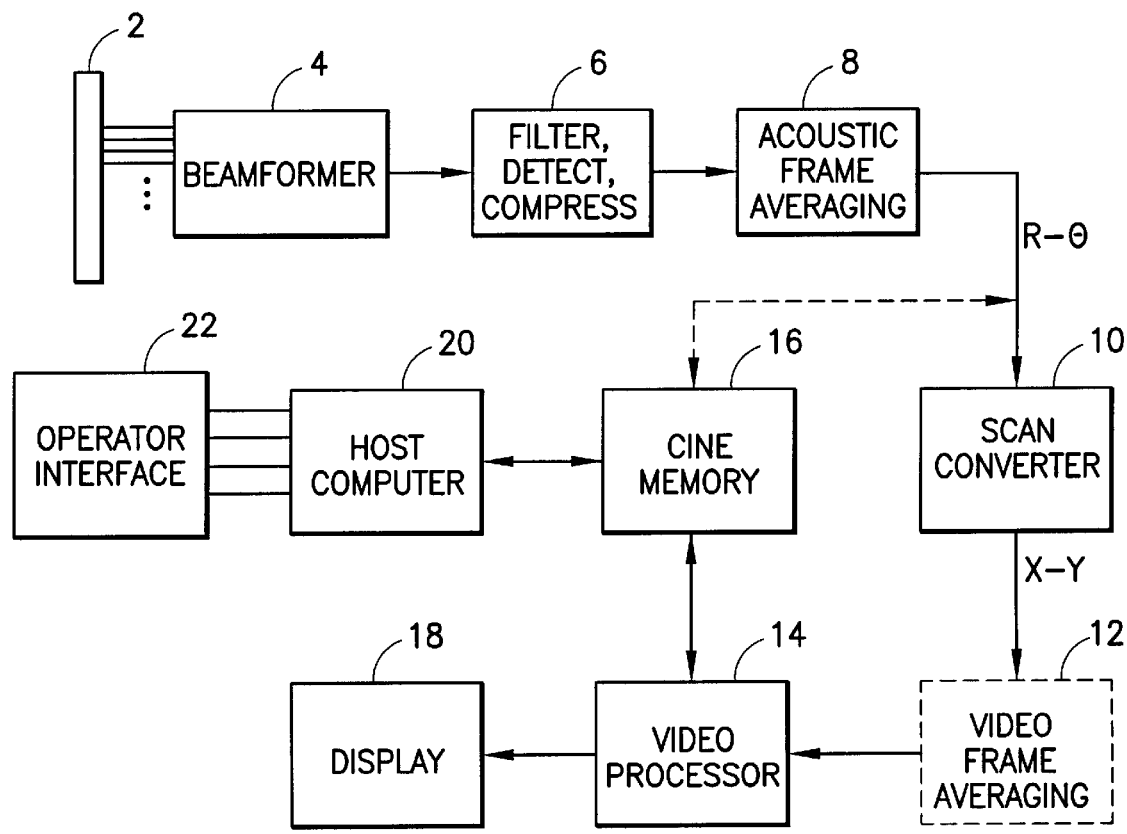
FIG. 1 is a block diagram showing a conventional ultrasound imaging system of the type which can be programmed to have user-selectable variable compression capability in accordance with preferred embodiments of the invention.

FIG. 1 shows a conventional computerized ultrasound imaging system which can be programmed to have the user-selectable variable data compression capability disclosed herein. The type of imaging system depicted in FIG. 1 has a B mode whereby the imager creates two-dimensional images of tissue and/or blood flow in which the intensity of each pixel is a function of the amplitude of the echo returned from a corresponding sample volume. The basic signal processing chain is as follows.

An ultrasound transducer array 2 is activated by a transmitter in a beamformer 4 to transmit an acoustic burst which is focused at a point or zone along a scan line. The return RF signals are detected by the transducer elements and then dynamically focused to form a receive beam by a receiver in the beamformer 4. The receive beamformer output data (I/Q or RF) for each scan line is passed through a B-mode processing chain 6, which preferably includes demodulation, filtering, envelope detection, logarithmic compression and edge enhancement.

Depending on the scan geometry, up to a few hundred receive vectors may be used to form a single acoustic image frame. To smooth the temporal transition from one acoustic frame to the next, some acoustic frame averaging 8 may be performed before scan conversion. In general, the log-compressed display data is converted by the scan converter 10 into X-Y format for video display. On some systems, frame averaging may be performed on the X-Y data (indicated by dashed block 12) rather than the acoustic frames before scan conversion, and sometimes duplicate video frames may be inserted between acoustic frames in order to achieve a given video display frame rate. The scan-converted frames are passed to a video processor 14, which maps the video data using a gray-scale mapping. The gray-scaled image frames are then sent to a video monitor 18 for display.

System control is centered in a host computer 20, which accepts operator inputs through an operator interface 22 and in turn controls the various subsystems. (In FIG. 1, only the image data transfer paths are depicted.) The operator interface comprises a keyboard, a trackball, a multiplicity of pushbuttons, and other input devices such as sliding and rotary knobs.

During imaging, a long sequence of the most recent images are stored and continuously updated automatically in a cine memory 16. Some systems are designed to save the R-θ acoustic images (this data path is indicated by the dashed line in FIG. 1), while other systems store the X-Y video images. The image loop stored in cine memory 16 can be reviewed via trackball control, and a section of the image loop can be selected for hard disk storage.

In accordance with the preferred embodiments of the invention, the host computer 20 is programmed with a variable compression capability which allows the system operator to compress the image data of a frozen frame to a level which can be varied. In particular, the variable compression software will vary the amount of compression applied to the frozen frame of image data as a function of the compression setting input by the system operator.

The method in accordance with one preferred embodiment of the invention comprises the following steps. During an examination performed on the ultrasound imaging system, the system operator will scan a patient by moving a hand-held ultrasound probe 2 over the surface of a part of the patient's anatomy. When the user has found an image of interest, the user will then operate an input device on the operator interface 22 which actuates a freeze image function, e.g., a so-called Freeze button. The Freeze input device may be a physical button which the system operator depresses or a virtual button on a graphical user interface which the system operator clicks on. In response to actuation of the freeze image function, the image is frozen on the display monitor 18. Typically, the frame of image data corresponding to the frozen image is stored in the cine memory 16 (along with a sequence of the preceding image frames).

After the image of interest has been frozen, the user can begin to compress the image data for that image by turning a variable compression dial clockwise. The variable compression dial is part of the operator interface 22. With each click of the compression dial, a new image will be displayed in real-time on the screen, each new image having a level of compression which increases incrementally with each click. Each click of the dial in the clockwise direction increments the compression ratio by some predefined amount (for example, 1%). Each click of the dial in the counter-clockwise direction will decrement the compression ratio by the same predefined amount. As the dial is turned one way or the other, the level of compression is adjusted accordingly and a new image having the adjusted compression level is automatically displayed on the screen.

In accordance with the preferred embodiment of the invention, the frame of image data corresponding to the original frozen image is always maintained in cine memory 16 in uncompressed form. This is important, as the compression is lossy, so the original image must be maintained to allow the user to decrement the level of compression or the compression ratio. Each newly compressed image is derived by the host computer 20 by applying a respective level of compression to the original frame of uncompressed image data which is retrieved from cine memory. After is data compression, the host computer 20 returns the compressed image to the cine memory 16 for display on the monitor 18. Only the most recently compressed image is stored temporarily in the cine memory 16, the next most recent compressed image being overwritten in cine memory at that time.

As the host computer 20 receives signals from the operator interface 22 to adjust the compression level, the newly adjusted image frame is displayed on the screen in real-time. The system operator can then stop adjusting the compression at the point where the operator has determined the image to still have an acceptable clinically diagnostic quality. When the system operator decides that the compressed image being viewed is acceptable for storage, he/she will then operate an input device (on the operator interface 22) to capture the compressed image permanently.

Figure 2:
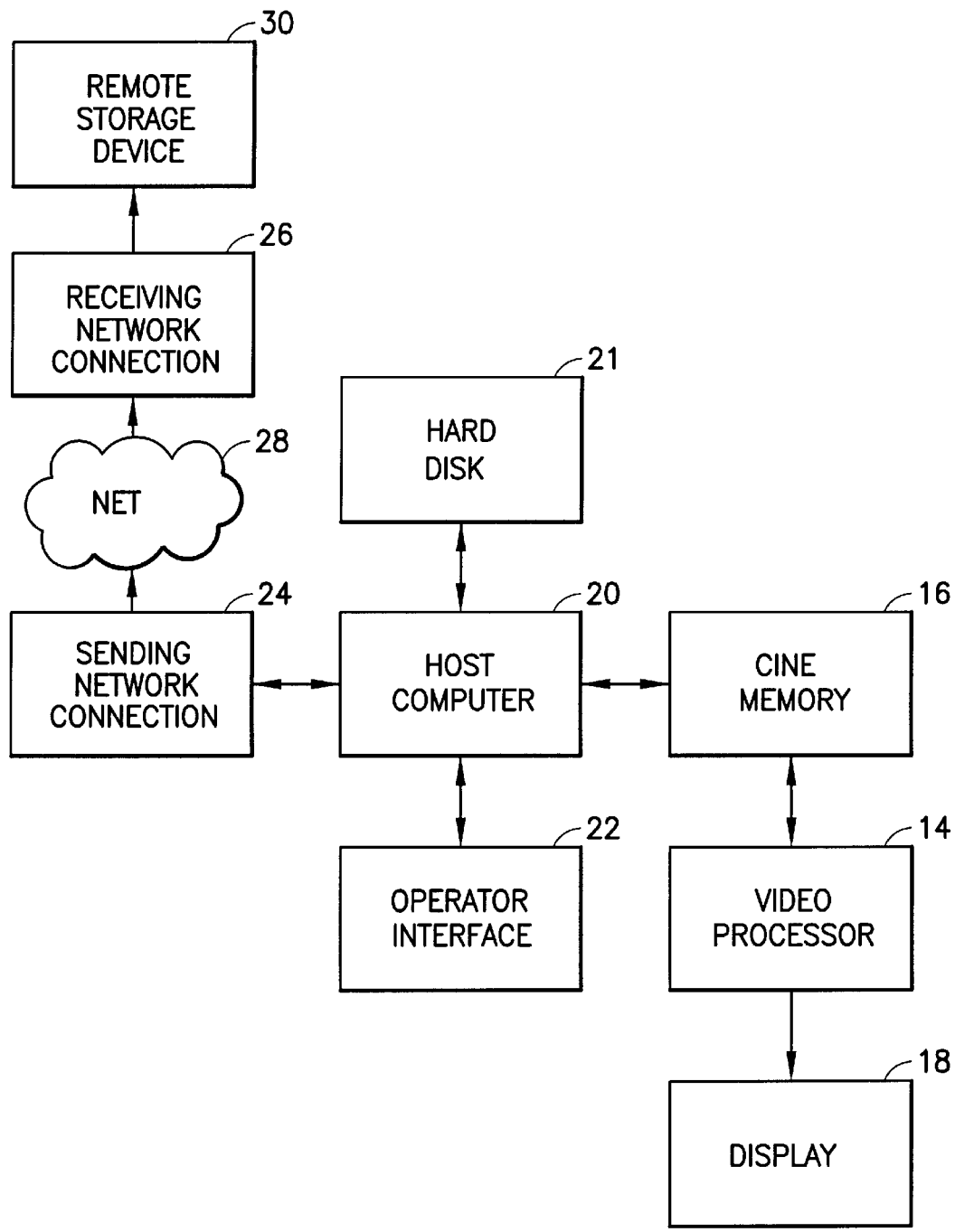
FIG. 2 is a block diagram showing an ultrasound imaging system having user-selectable variable compression capability and connected to a DICOM network in accordance with a preferred embodiment of the invention.

Referring to FIG. 2, if the system operator wishes to save the compressed image to the imaging system hard disk; 21, the operator actuates a save image function. Again the save image input device may be either a physical button depressed by the system operator or a virtual button on a graphical user interface which the system operator clicks on. In response to actuation of the save image function, the compressed version of the frozen image is captured from cine memory 21 and stored on the hard disk 21. Thus once the user has selected the appropriate compression level, the frozen image compressed to the selected level can then be saved. With this method, the amount of data stored for each image will vary. The overall result will be saved hard disk space while maintaining diagnostic quality.

Alternatively the system operator may wish to send the compressed image via a network to a DICOM compatible remote storage device. FIG. 2 generally depicts a simplified system comprising an imaging system programmed to output images in a compressed format via a transmitting network connection 24, a remote storage device 30 which receive images from the imaging system via a receiving network connection 26, and a network 28 for connecting the transmitting network connection 24 to the receiving network connection 26. The network 28 may comprise a local area network, a wide area network, a corporate intranet, the Internet, or any other network system, including a system of networks interconnected via gateways. The network connections each comprise a networking port and suitable networking software for formatting the data in accordance with the appropriate network protocol. In the example shown in FIG. 2, the sending device is an ultrasound imaging system (scanner) having the built-in capability to communicate with remote storage devices in conformance with the DICOM requirements, and the network 28 is a local area network having many other types of devices (not shown) connected thereto. For example, the network 28 may be connected to additional storage devices, printing devices, and imagers of different modalities. As used herein, the term "storage device" includes, but is not limited to, a picture archiving and communications system (PACS) having a viewing station. The ultrasound imaging system partially depicted in FIG. 2 is of the same type depicted more fully in FIG. 1, with similar functional components designated by the same reference numerals.

In order to accomplish DICOM image transfer to a remote storage device, the ultrasound imaging system must know the configuration of that storage device prior to attempting to communicate with it. The configuration data for the destination remote storage device is typically inputted to the ultrasound imager during software installation by a field engineer, although any DICOM-compatible remote device can be configured at any time. When the imager receives an instruction to transmit data to a particular remote storage device from the system operator via the operator interface, the imager software converts the image data to be transferred into the DICOM format required by the destination remote storage device, based on the configuration data for that storage device stored in imaging system memory. The imager also sends a request over the network to the destination remote storage device to open an association, i.e., to connect the imager to the destination remote storage device. If the remote storage device responds in the affirmative, the imager and remote storage device then agree on which device will act as the server and which as the client. The ultrasound imager also selects the appropriate encoding syntax from those accepted by the remote storage device. Other communication parameters are also negotiated. After the DICOM communications protocol has been settled, the association is opened and the imager attempts to send the DICOM-formatted image file (object) to the remote storage device via the network. The transfer is done in the background while scanning or other operator activities continue. Each image file is transferred singly in response to a Send request inputted by the operator.

Figure 3:
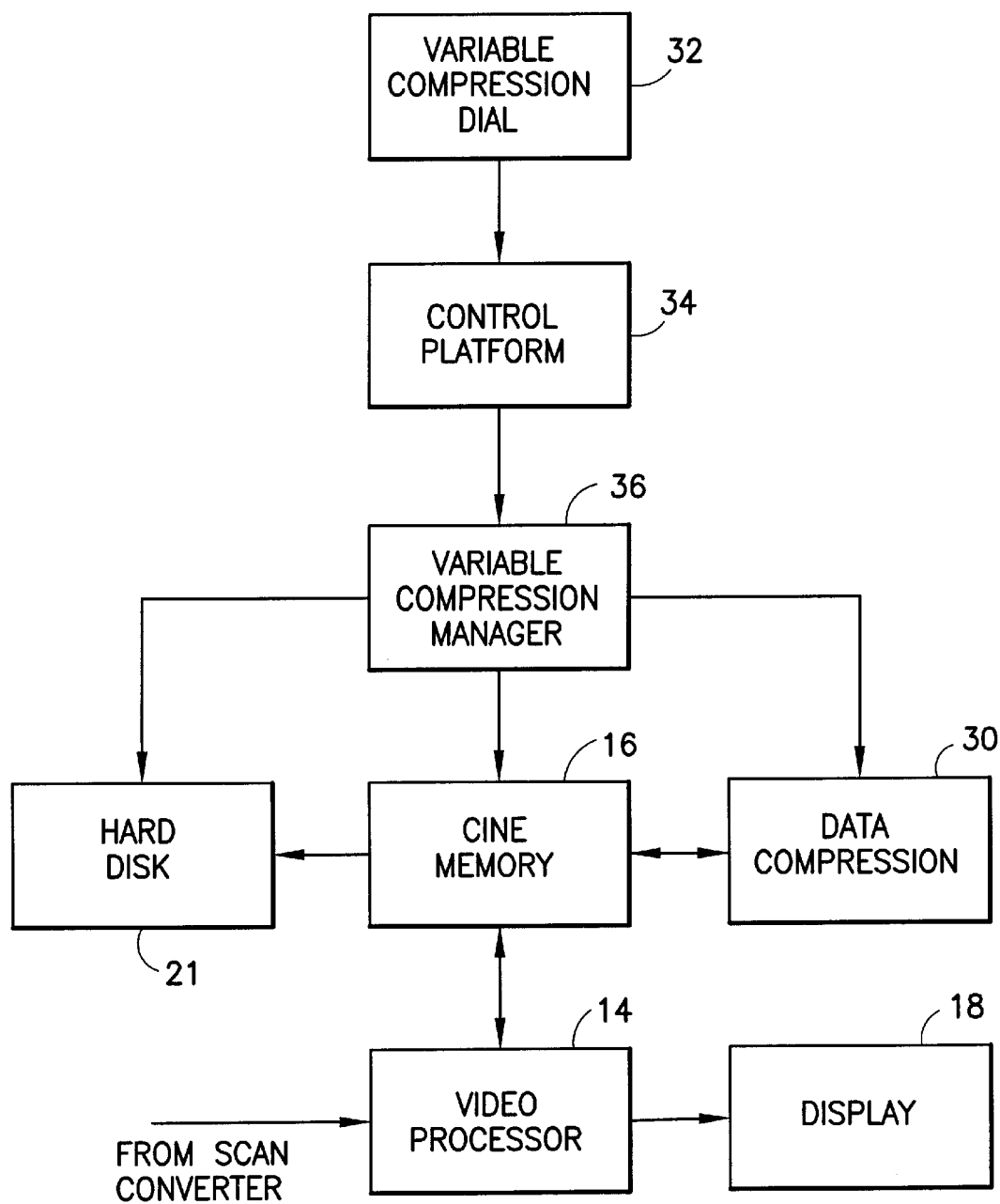
FIG. 3 is a block diagram showing the ultrasound imaging system of FIG. 1 in more detail.

In accordance with a preferred embodiment of the invention, the host computer of the ultrasound imaging system is programmed with the capability to extract a frozen frame of digital image data from the cine memory, compress the image frame using a lossy compression technique, and then store the compressed image on the hard disk of the imaging system. The portions of the ultrasound imager involved in this process are generally depicted in FIG. 3. At the outset it should be appreciated that blocks 32, 34 and 36 depicted in FIG. 3 are preferably, but not necessarily, implemented as software in the host computer (20 in FIG. 1).

The operator interface in accordance with the preferred embodiment of the invention comprises a variable compression dial 32 that allows the system operator to manually vary the level of compression or the compression ratio while viewing each compressed image. Preferably the dial is rotatable in equiangular increments through successive click positions. For example, for each click that the user turns the dial clockwise, the frame of image data which was frozen is compressed incrementally. Each compressed version of the frozen image is displayed on the screen 18. If the user over-compresses the image, then the user can turn the dial counter-clockwise, thereby reducing the level of compression in equal decrements. Alternatively, the level of compression or the compression ratio could be set by manipulating keys on a keyboard, by translating a calibrated sliding mechanism, by interacting with virtual, i.e., soft, keys of a graphical user interface, or any other user input device.

In the system depicted in FIG. 3, commands inputted via the operator interface are detected and processed by a control platform 34, including clicks inputted via a rotary variable compression dial 32. Each time the rotary dial is clicked, the control platform 34 sends a control signal to the variable compression manager 36. The control signal includes a sign bit for indicating the direction of dial rotation, namely, clockwise or counterclockwise. The control platform 34 also advises the variable compression manager 36 when an image has been frozen. The variable compression manager 36 keeps track of the rotational position of the rotary dial by counting the number of clicks, subsequent to the image being frozen, in the clockwise and counterclockwise directions. The position of the dial is set to zero in the variable compression manager 36 when the image is frozen.

The variable compression manager 36 converts each new rotational position of the rotary dial into a level of compression value, which is input to the data compression software module 38. Each time the rotary dial is clicked to a new rotational position, the variable compression manager 36 coordinates the transfer of the uncompressed image data of the frozen frame from the cine memory 16 to the data compression software module 38. The data compression software then compresses the frozen frame to a level of compression dictated by the compression level value received from the variable compression manager. The compressed image is then stored in the cine memory, being written over any previously compressed frame. This newly compressed frame is also passed to the video processor 14 for display on the monitor 18.

In accordance with the preferred embodiment, for each compression level the data compression software compresses the copy of the frozen frame by a corresponding factory-determined amount using lossy compression. This factory-determined amount could be anything. However, it is preferred that the incremental and decremental changes in the level of compression have the same magnitude for each click. In other words, if the level of compression is to be changed in increments or decrements of 1%, then each click should represent a 1% change. Therefore, if the user turns the dial 5 clicks clockwise, then a 5% compression is applied. If the user then turns the dial counterclockwise one click (after the previous 5 clicks in the clockwise direction), then a new image is displayed with 4% compression applied. There will only be at maximum two versions of the original frozen image in cine memory: the original and the most recently, i.e., newly, compressed image. The user will continue to turn the dial clockwise until the user thinks the frozen image is compressed to its maximum amount while still showing diagnostic quality for the region of interest. At the time the user reaches adequate compression accompanied by satisfactory diagnostic quality, the user can save the compressed image to the hard disk 21.

In accordance with the preferred embodiment, the JPEG data compression technique is used. JPEG files can be decoded by special hardware or by software. JPEG achieves a high compression rate by storing only the changes from one frame to another, instead of each entire frame. The image information is then encoded using a technique called Discrete Cosine Transform (DCT). DCT is a technique for representing waveform data as a weighted sum of cosines. DCT is commonly used for data compression. The JPEG data compression technology approximates some of the DCT coefficients to reduce the amount of data, resulting in lossy compression since some data is removed. However, the invention allows the user to select the maximum loss of data which still produces an image having sufficient diagnostic quality.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. An imaging system comprising:
   an image acquisition subsystem for acquiring frames of uncompressed image data;
   memory storing said acquired frames of uncompressed image data;
   a display subsystem for displaying images derived from said acquired frames of uncompressed image data;
   a first user-operable input device for selecting one of said acquired frames of uncompressed image data from said memory;
   a second user-operable input device having respective positional states for selecting any one of a multiplicity of levels of data compression;
   a variable compression manager that converts each new positional state of said second user-operable input device into a respective data compression value representing a respective selected level of data compression;
   a data compressor which compresses the uncompressed image data in said selected frame as a function of each data compression value received from said variable compression manager to produce a respective frame of compressed image data; and
   a display processor for controlling said display subsystem to display each frame of compressed image data,
   wherein said variable compression manager causes said selected acquired frame of uncompressed image data to be sent from said memory to said data compressor each time a new data compression value is sent to said data compressor, and further causes each successive frame of compressed image data to be sent from said data compressor to said memory, where each successive frame of compressed image data is written over the previous frame of compressed image data.

2. The imaging system as recited in claim 1, further comprising a hard disk and a third user-operable input device for actuating storing said frame of compressed image data on said hard disk.

3. The imaging system as recited in claim 1, further comprising a networking port and a third user-operable input device for actuating sending said frame of compressed image data to said networking port.

4. The imaging system as recited in claim 1, wherein said image acquisition subsystem comprises an array of ultrasound transducer elements.

5. The imaging system as recited in claim 1, wherein said user-operable input device comprises a rotary dial.

6. The imaging system as recited in claim 5, wherein said rotary dial has a multiplicity of discrete rotational positions, each one of said rotational positions corresponding to a different level of data compression.

7. The imaging system as recited in claim 6, wherein said different levels of data compression increase incrementally by a constant amount.

8. The imaging system as recited in claim 5, wherein said variable compression manager sets the current position of said rotary dial to a data compression value equal to zero when an acquired frame of uncompressed image data is selected, and said data compressor increases the level of compression to be applied as said rotary dial is rotated in one direction and decreases the level of compression to be applied as said rotary dial is rotated in another direction opposite to said one direction.

9. The imaging system as recited in claim 1, wherein said data compressor employs a lossy compression technique.

10. An imaging system comprising:
    an image acquisition subsystem for acquiring frames of uncompressed image data;
    memory storing said acquired frames of uncompressed image data;
    a display subsystem for displaying images derived from said acquired frames of uncompressed image data;
    a first user-operable input device for selecting one of said acquired frames of uncompressed image data from said memory;
    a second user-operable input device having respective positional states for selecting any one of a multiplicity of levels of data compression;
    a computer programmed to perform the following steps:
    converting each new positional state of said second user-operable input device into a respective data compression value representing a respective selected level of data compression;
    compressing the uncompressed image data in said selected frame as a function of each data compression value received from said variable compression manager to produce a respective frame of compressed image data;
    controlling said display subsystem to display each frame of compressed image data;
    causing said selected acquired frame of uncompressed image data to be sent from said memory to said data compressor each time a new data compression value is sent to said data compressor; and causing each successive frame of compressed image data to be sent from said data compressor to said memory, where each successive frame of compressed image data is written over the previous frame of compressed image data.

11. The imaging system as recited in claim 10, wherein said image acquisition subsystem comprises an array of ultrasound transducer elements.

12. The imaging system as recited in claim 10, wherein said user-operable input device comprises a rotary dial.

13. The imaging system as recited in claim 12, wherein said rotary dial has a multiplicity of discrete rotational positions, each one of said rotational positions corresponding to a different level of data compression.

14. The imaging system as recited in claim 10, wherein said data compression step employs a lossy compression technique.

15. A method of storing image data, comprising the steps of:

acquiring a first frame of uncompressed image data;

storing said first frame of uncompressed image data in memory;

adjusting the position of a manipulatable mechanism to a first setting;

determining a first level of data compression as a function of said first setting;

retrieving said first frame of uncompressed image data from memory and compressing the image data in said first frame of uncompressed image data as a function of said first level of data compression to produce a first frame of compressed image data;

writing said first frame of compressed image data into memory;

displaying a first image derived from said first frame of compressed image data;

readjusting the position of the manipulatable mechanism to a second setting;

determining a second level of data compression as a function of said second setting, said second level of data compression being different than said first level of data compression;

retrieving said first frame of uncompressed image data from memory again and compressing the image data in said first frame of uncompressed image data as a function of said second level of data compression to produce a second frame of compressed image data;

writing said second frame of compressed image data over said first frame of compressed image data in memory; and displaying a second image derived from said second frame of compressed image data.

16. The method as recited in claim 15, wherein said adjusting step comprises the step of rotating a rotary dial.

17. The method as recited in claim 15, wherein said acquiring step comprises the steps of transmitting ultrasonic beams in a scan plane and detecting ultrasonic echoes returned from said scan plane.

18. The method as recited in claim 16, further comprising the steps of increasing the level of compression to be applied as said rotary dial is rotated in one direction and decreasing the level of compression to be applied as said rotary dial is rotated in another direction opposite to said one direction.

19. The method as recited in claim 18, wherein the level of compression is increased by a predefined increment for each equal increment in the angle of rotation of said rotary dial in said first direction.

20. The method as recited in claim 15, wherein said compressing step employs a lossy compression technique.

* * * * *